(12) United States Patent
Schmaling et al.

(10) Patent No.: US 7,841,829 B2
(45) Date of Patent: Nov. 30, 2010

(54) ROTOR SYSTEM WITH PITCH FLAP COUPLING

(75) Inventors: David N. Schmaling, Southbury, CT (US); Pedro L. Cabrera, West Haven, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1049 days.

(21) Appl. No.: 11/560,008

(22) Filed: Nov. 15, 2006

(65) Prior Publication Data

US 2008/0112808 A1   May 15, 2008

(51) Int. Cl.
   *F01D 5/00* (2006.01)
(52) U.S. Cl. .............................. 416/1; 416/24
(58) Field of Classification Search .............. 416/1, 416/134 A, 142, 159, 23, 24, 114, 147, 148, 416/102, 104, 141
   See application file for complete search history.

(56) References Cited

U.S. PATENT DOCUMENTS

| | | | | | |
|---|---|---|---|---|---|
| 4,231,705 | A | * | 11/1980 | Watson ....................... | 416/108 |
| 4,235,570 | A | * | 11/1980 | Ferris et al. ............. | 416/134 A |
| 4,304,525 | A | * | 12/1981 | Mouille ................... | 416/134 A |
| 6,050,778 | A | * | 4/2000 | McArdle et al. ............ | 416/107 |
| 6,695,253 | B1 | * | 2/2004 | Romani et al. .................. | 244/6 |

OTHER PUBLICATIONS

International Search Report and Written Opinion dated Oct. 10, 2008.

\* cited by examiner

*Primary Examiner*—Ninh H Nguyen
*Assistant Examiner*—Aaron R Eastman
(74) *Attorney, Agent, or Firm*—Carlson Gaskey & Olds PC

(57) ABSTRACT

An articulated rotor system with a servo-flap rotor control system locates the focal point of a blade retention spherical elastomeric bearing inboard of a joint in the servo-flap pitch control tube which separates the flap hinge and supports the servo-flap pitch control tube on a single pivot bearing within a blade retention spindle. Rotor blade flapping produces relative movements between the servo-flap pitch control tube and the blade retention spindle which is converted through a servo-flap drive linkage into servo-flap pitch motions to provide flap/pitch coupling which reduces steady and transient blade flapping.

24 Claims, 12 Drawing Sheets

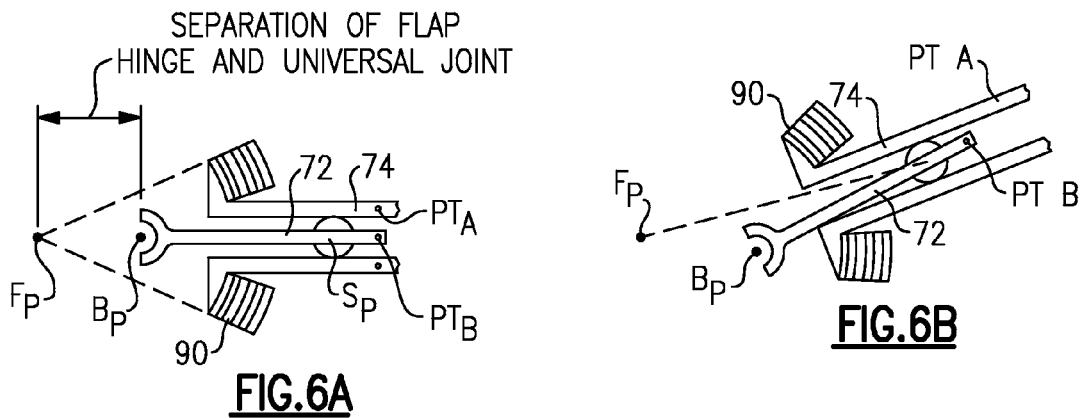
FIG.6A
FIG.6B
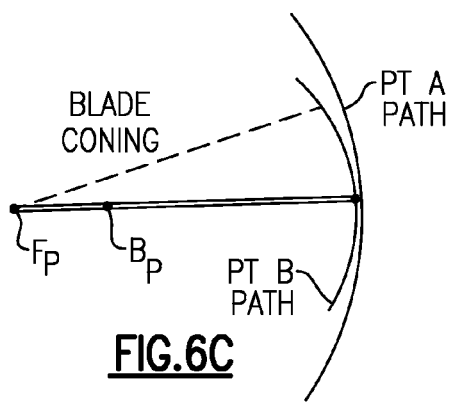
FIG.6C
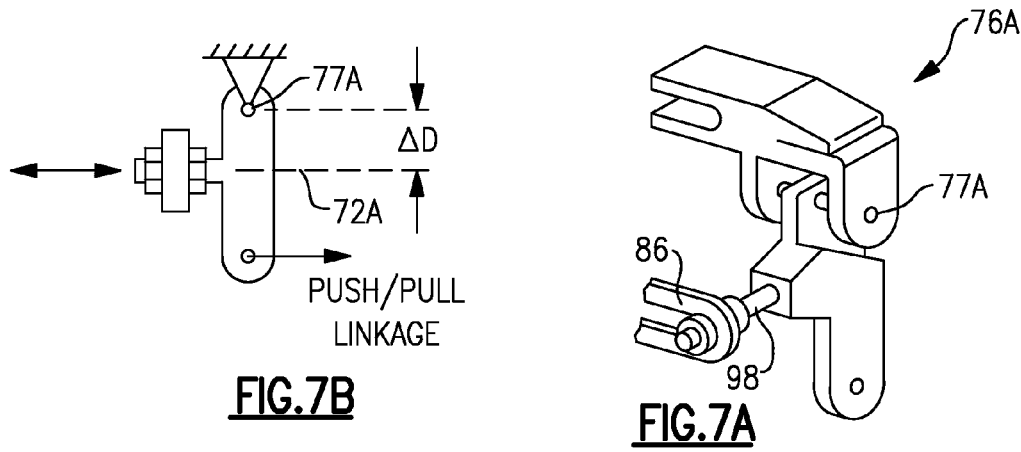
FIG.7B
FIG.7A

ROTOR SYSTEM WITH PITCH FLAP COUPLING

BACKGROUND OF THE INVENTION

The present invention relates to a servo-flap rotor blade system of a rotary-wing aircraft, and more particularly to a servo-flap rotor blade system with an adjustable pitch/flap coupling.

The rotor systems for rotary-wing aircraft such as helicopters and tilt rotor aircraft are relatively complex systems. The rotor system needs to respond to the pilot's input, but also needs to accommodate forces acting upon the rotor system which may be generally outside of direct pilot control.

In a fully articulated rotor system, each individual rotor blade is attached to the rotor hub such that the rotor blade may pitch, lead/lag and flap. Blade pitch is generally under direct management by the pilot through the flight control system. Lead/lag and flapping motion, however, are generally not under the pilot's direct control as these motions are in response to forces from the constantly changing balance between lift, centrifugal, and inertial forces for which the fully articulated hub provides the necessary articulation mechanisms.

Large flapwise loads may cause pitch changes in the rotor blades such that rotor system response may become relatively sluggish, i.e., counteracts cyclic inputs. The detrimental effects of rotor blade flapping, especially in high speed rotary-wing aircraft may be minimized through a pitch-flap coupling (Delta-3) subsystem. Pitch-flap coupling essentially introduces an aerodynamic spring that increases the effective natural frequency of the flap motion to reduce steady and transient blade flapping.

In a fully articulated servo-flap rotor system, there is no direct control link to the rotor blades such that incorporation of a pitch-flap coupling (Delta-3) subsystem may be relatively complicated.

Accordingly, it is desirable to provide a pitch-flap coupling (Delta-3) subsystem for a fully articulated servo-flap rotor system.

SUMMARY OF THE INVENTION

An articulated rotor system with a servo-flap rotor control system according to the present invention generally includes a bearing housing which rotationally supports a blade pitch control coupling which rotates about a hub spindle axis. The blade pitch control coupling rotates a servo-flap pitch control tube about a servo-flap control tube axis within a rotor blade retention spindle. Rotation of the servo-flap pitch control tube articulates a servo-flap drive linkage mounted to a rotor blade cuff. The servo-flap drive linkage drives a push/pull link to operate a servo-flap linkage which converts the push/pull motion into a pitching motion of a servo-flap relative to each rotor blade.

The flapping and lead/lag motions of the rotor blade are decoupled from the blade pitch control coupling assembly by a joint which defines a servo-flap pitch control tube pivot point. A focal point of an elastomeric spherical bearing which supports the rotor blade retention spindle is located along the hub spindle axis inboard of the servo-flap pitch control tube pivot point. The blade servo-flap pitch control tube is pivotally mounted within the blade retention spindle about a spherical pivot bearing which defines a spherical pivot point located outboard of the servo-flap pitch control tube pivot point. By projecting the focal point of the elastomeric spherical bearing inboard of the pitch control tube pivot point and allowing the blade servo-flap pitch control tube to pivot about a single spherical pivot bearing, blade flap will produce relative motion between the blade servo-flap pitch control tube, and the blade retention spindle. This relative motion is converted by the servo-flap drive linkage into servo-flap pitch motion.

In operation, since the elastomeric spherical bearing focal point is located inboard of the servo-flap pitch control tube pivot point, and the blade servo-flap pitch control tube is free to tilt relative to the blade retention spindle as the blade flaps, a stabilizing pitch-flap coupling can be generated. That is, during blade flapping, relative vertical and radial motions occur between the blade servo-flap pitch control tube and the blade retention spindle. These relative vertical and radial motions drive the servo-flap drive linkage to pitch the servo-flap relative the rotor blade. Flapping up produces a tension in the push/pull link to pitch the servo-flap up which thereby provides a pitch-down movement in the rotor blade.

The present invention therefore provides a pitch-flap coupling (Delta-3) subsystem for a fully articulated servo-flap rotor system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 6A is a schematic view of a pitch-flap coupling (Delta-3) subsystem according to the present invention;

FIG. 6B is a schematic view of the pitch-flap coupling (Delta-3) subsystem of FIG. 6A in a flapped position;

FIG. 6C is a schematic of the relative radial movement between representational points A and B illustrating the foreshortening (spanwise relative movement between points A and B) which occurs during blade flapping;

FIG. 7A is a perspective view of another servo-flap drive linkage which is configured to convert both vertical and radial relative motions into favorable pitch/flap coupling; and FIG. 7B is a side view of the servo-flap drive linkage of FIG. 7A.

DETAILED DESCRIPTION OF THE PREFERRED EMBODIMENT

Figure 1A:
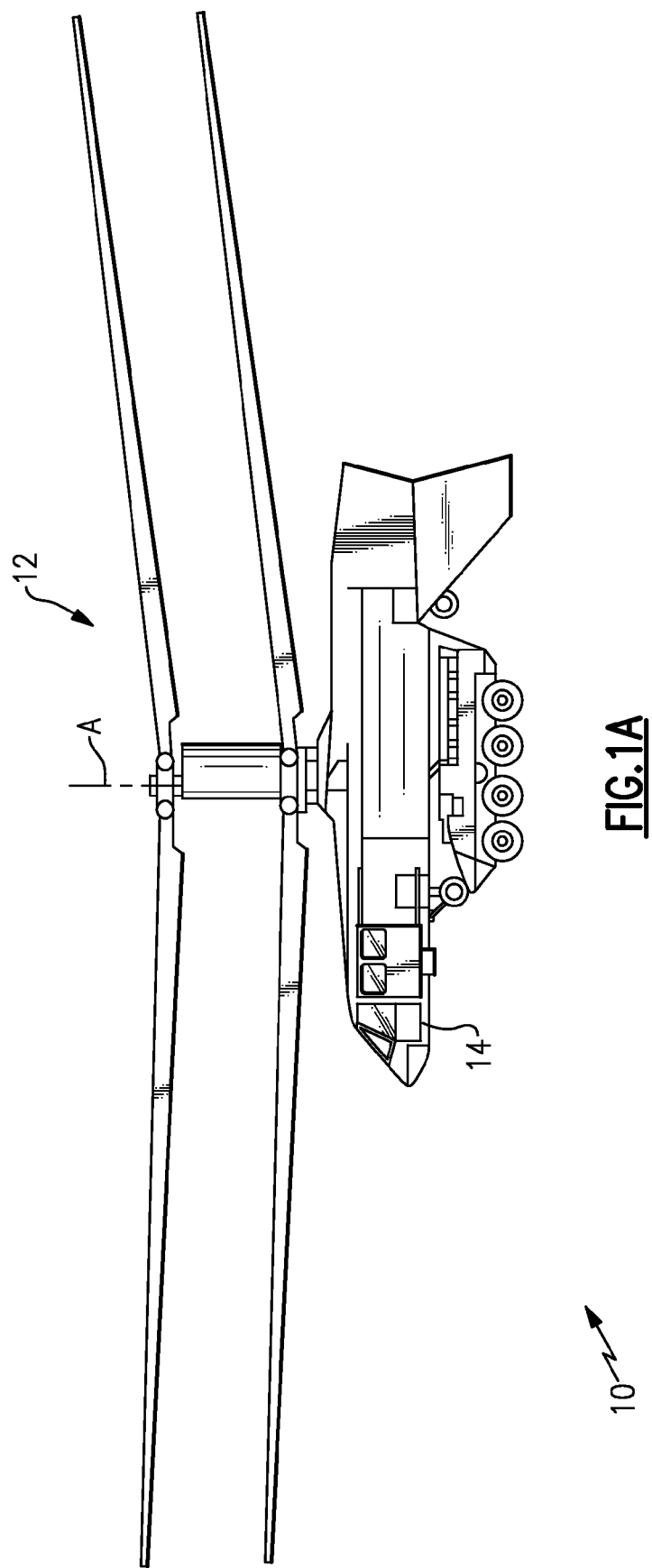
FIG. 1A is a general perspective side view of an exemplary dual, counter-rotating, coaxial rotor system rotary-wing aircraft embodiment for use with the present invention.
Figure 1B:
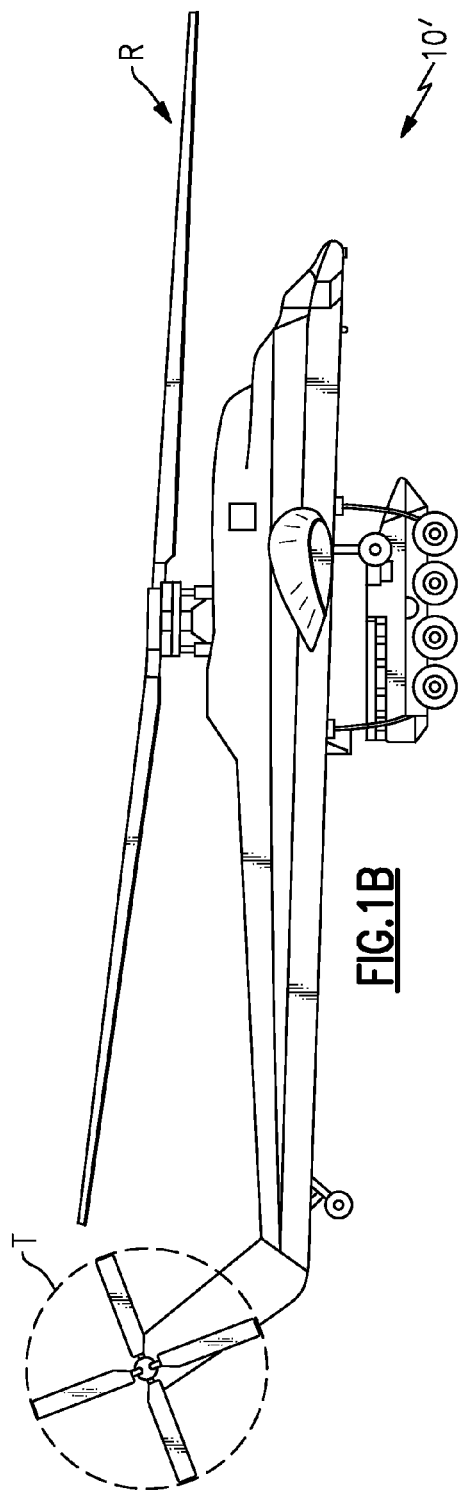
FIG. 1B is a general perspective side view of a crane type rotary-wing aircraft embodiment for use with the present invention.

FIG. 1A illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12. Although a particular type rotary-wing aircraft configuration is illustrated in the disclosed embodiment, other aircraft such as single rotor flying crane helicopters 10' having a single main rotor assembly R and an anti-torque rotor T mounted to an extended tail (FIG. 1B), tilt-rotor and tilt-wing aircraft which utilize a servo-flap rotor control system will also benefit from the present invention.

Figure 2:
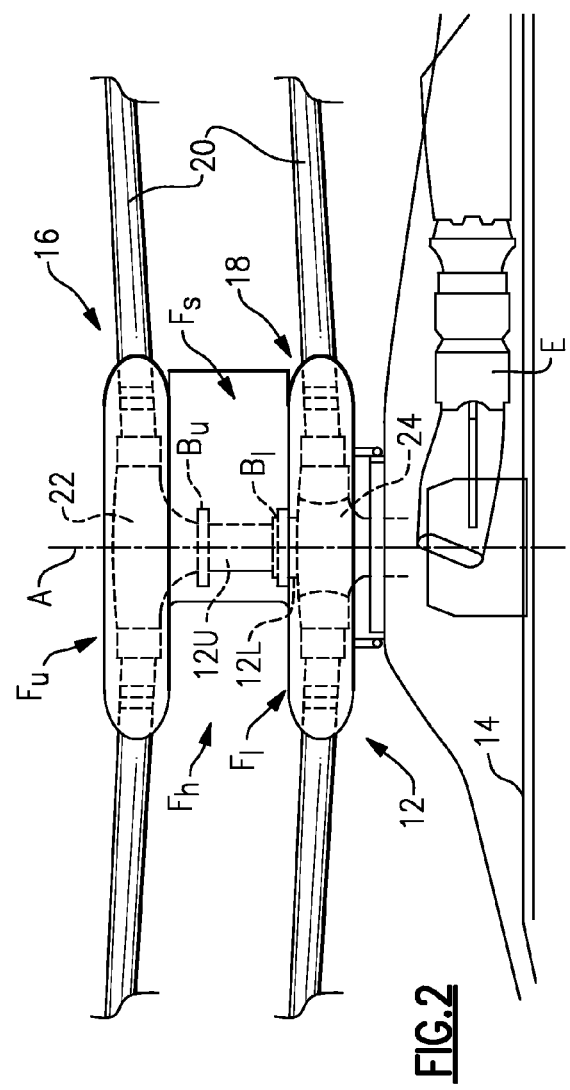
FIG. 2 is an expanded partial phantom view of a dual, counter-rotating, coaxial rotor system of the aircraft of FIG. 1A.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about the rotor axis of rotation A. The rotor system 12 preferably includes a rotor hub fairing system Fh generally located between and around the upper and lower rotor systems 16, 18 such that the rotor hub assemblies 22, 24 are at least partially contained therein. The rotor hub fairing system Fh includes an upper hub fairing Fu, a lower hub fairing Fl and a shaft fairing Fs therebetween. The shaft fairing Fs is attached to the counter-rotating, coaxial rotor system 12 through a bearing arrangement Bu, B1 such that the shaft fairing Fs is aligned with the relative wind in forward flight but may be free to pivot during low speed maneuvering. The upper bearing Bu and the lower bearing B1 are respectively located adjacent an upper portion and a lower portion of the shaft fairing Fs. The upper bearing Bu is preferably attached to one rotor shaft 12U while the lower bearing B1 attached to the other rotor shaft 12L such that the bearings counter-rotate and net bearing drag is relatively low.

Figure 3A:
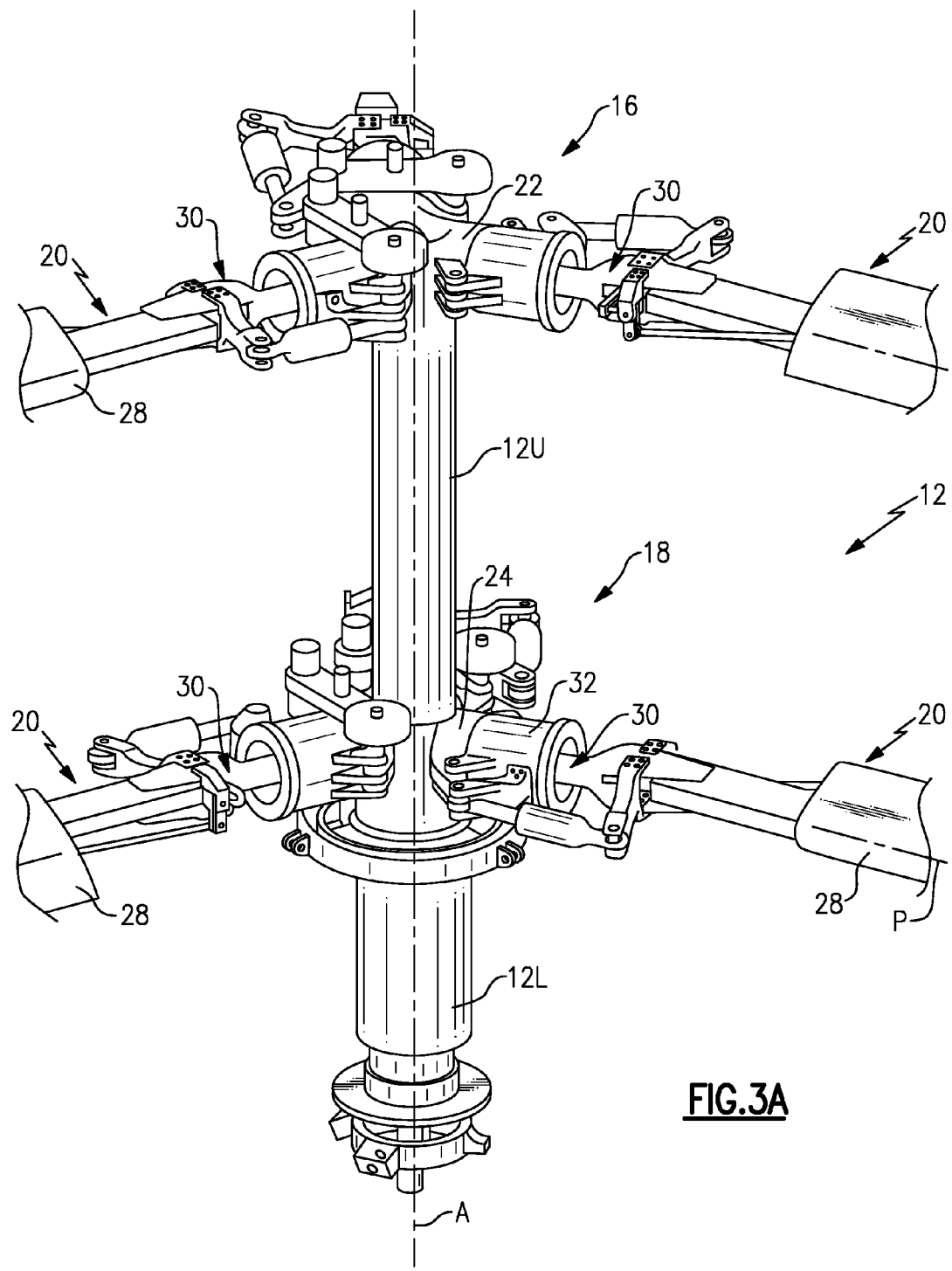
FIG. 3A is a perspective view of a dual, counter-rotating, coaxial rotor system in a flight position.
Figure 3B:
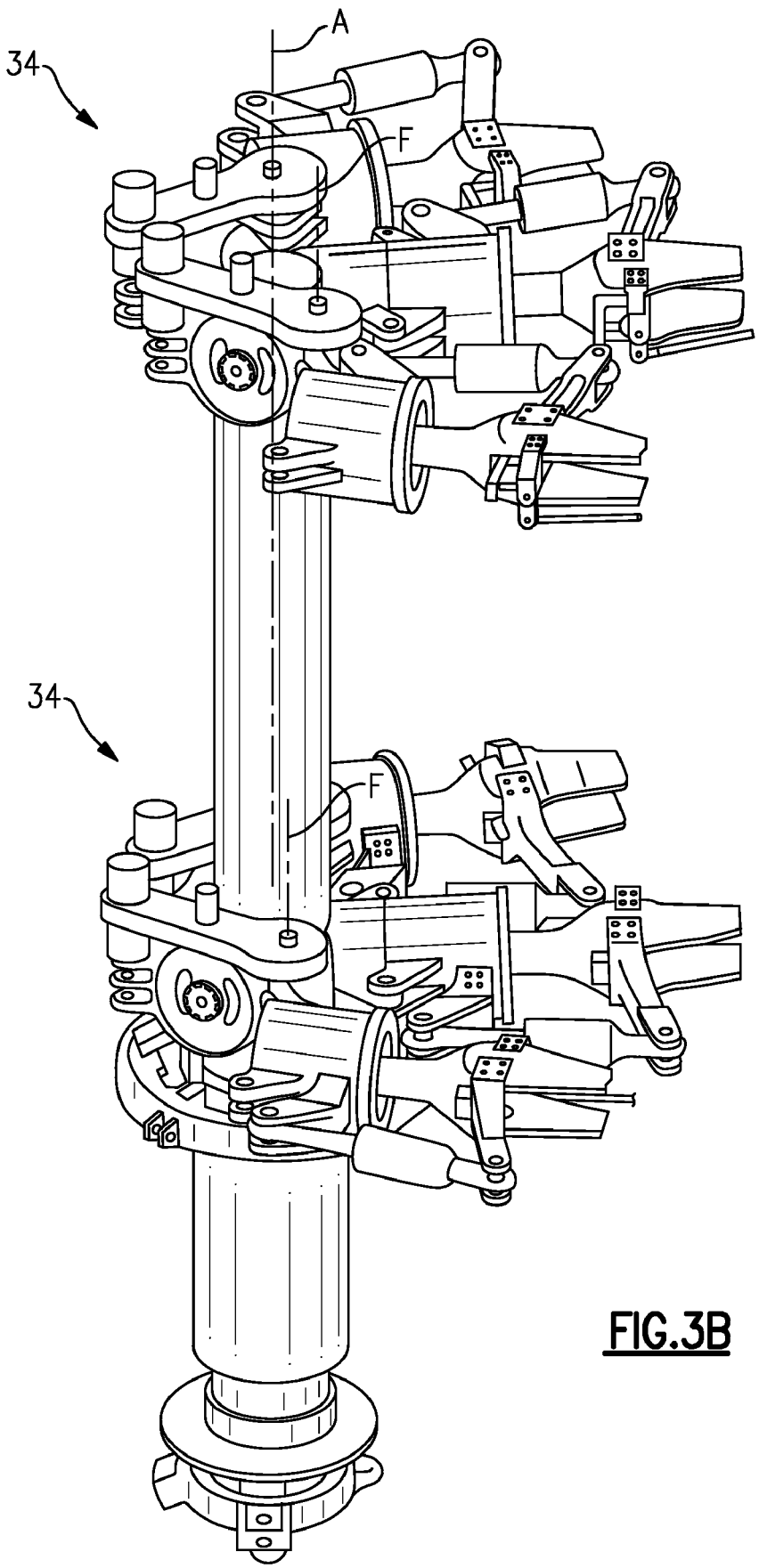
FIG. 3B is a perspective view of the dual, counter-rotating, coaxial rotor system in a folded position.

Referring to FIG. 3A, each rotor blade assembly 20 of the rotor system 12 generally includes a rotor blade 28 (illustrated somewhat schematically), a rotor blade spindle assembly 30, and a bearing housing 32 which folds relative the rotor hub assembly 22, 24 about a fold axis F in response to a rotor blade folding system 34 (FIG. 3B).

Figure 3C:
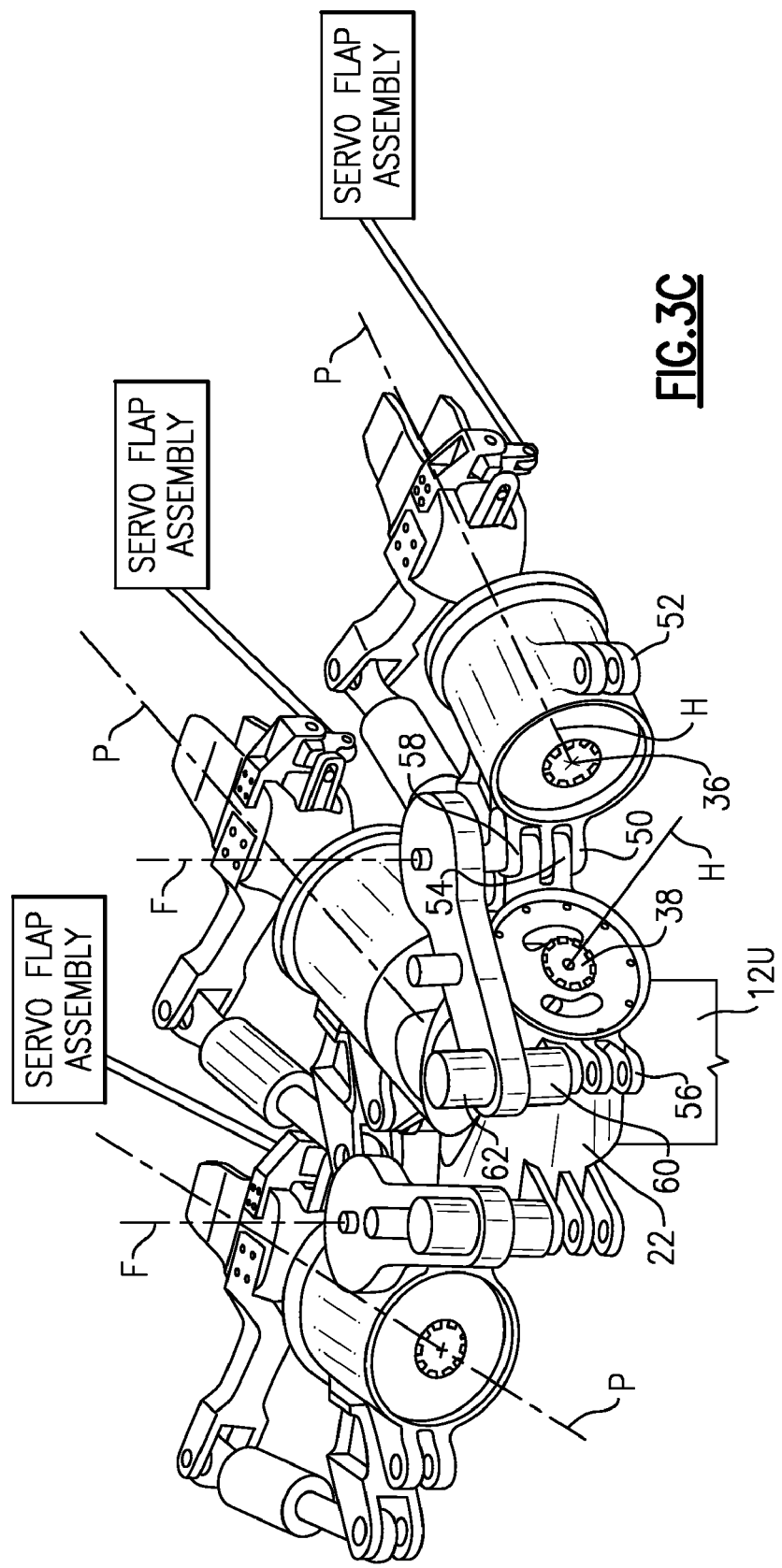
FIG. 3C is an expanded perspective view of the upper hub assembly of the dual, counter-rotating, coaxial rotor system in a folded position.
Figure 3D:
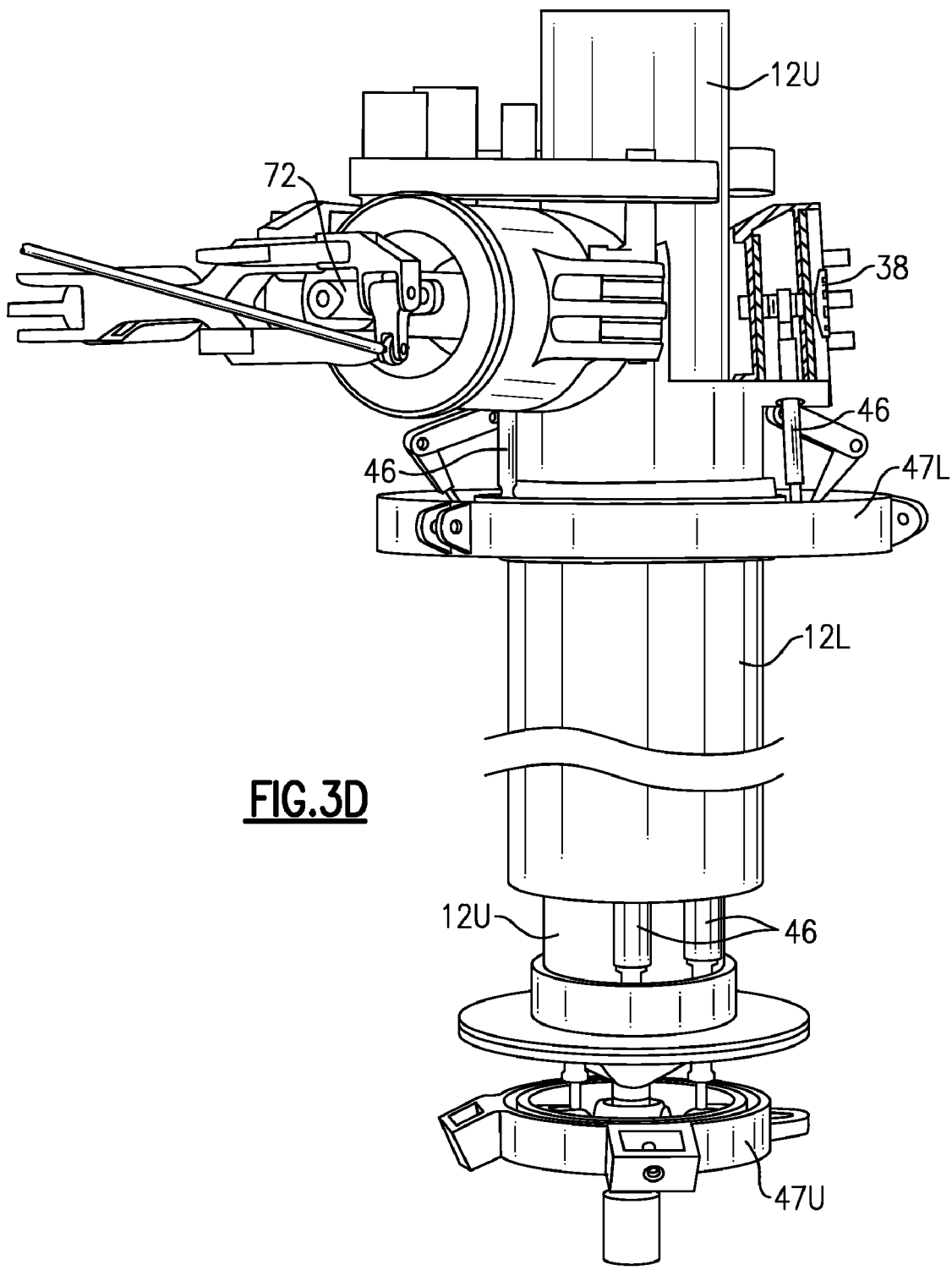
FIG. 3D is an expanded perspective view of the actuator system of the dual, counter-rotating, coaxial rotor system in a folded position.
Figure 3E:
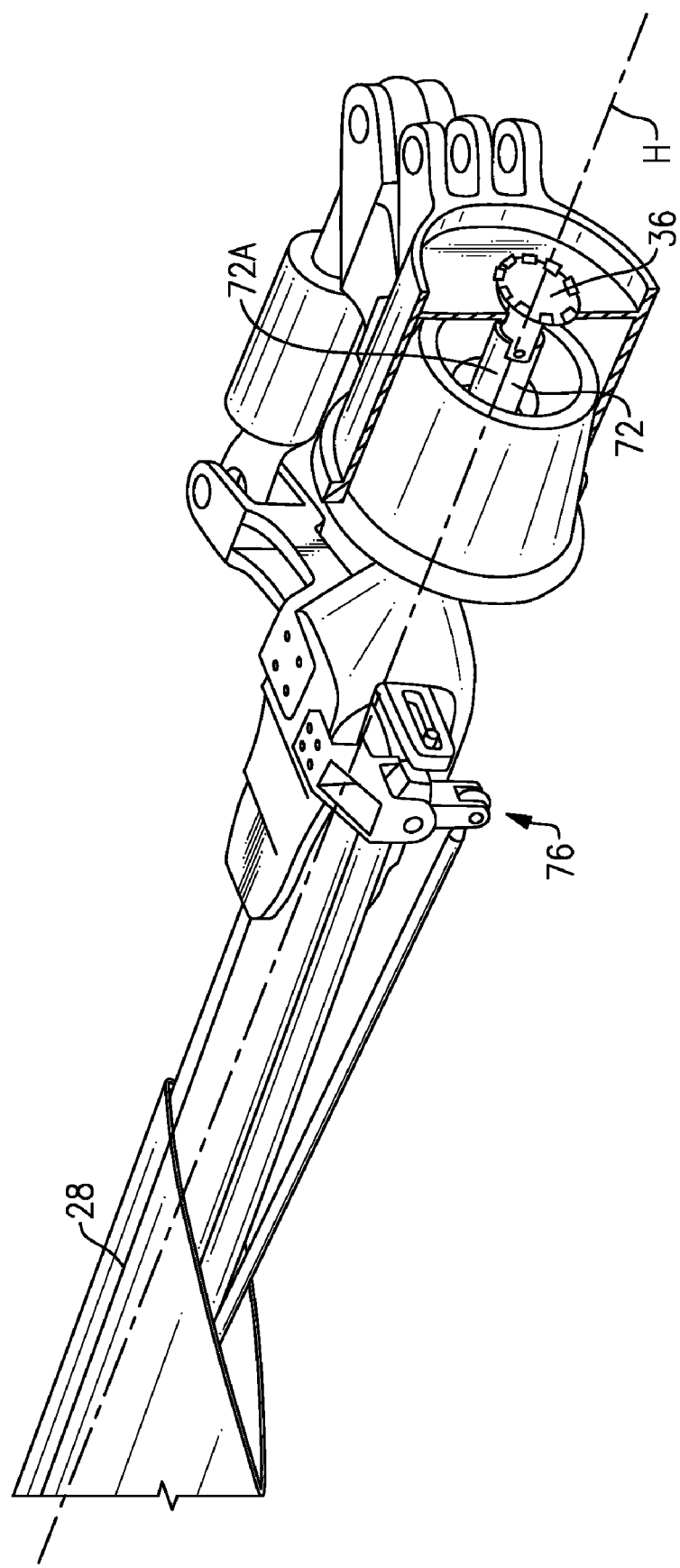
FIG. 3E is a perspective partial sectional view of a rotor blade assembly of the dual, counter-rotating, coaxial rotor system.

Referring to FIG. 3C, a pitch control coupling assembly 35 for each rotor blade assembly 20 includes a blade pitch control coupling 36 and a horn spindle coupling 38 rotationally mounted to the rotor hub assembly 22, 24 for rotation about a hub spindle axis H. The hub spindle axis H is generally in-line with the pitch axis P when the bearing housing 32 is in the flight position (FIG. 3A). The blade pitch control coupling 36 rotationally engages the horn spindle coupling 38 at an interface when the bearing housing 32 is in the flight position. The interface may be a toothed interface as illustrated or another interface to rotationally lock the blade pitch control coupling 36 with the horn spindle coupling 38 such that a pitch input to the horn spindle coupling 38 is transmitted to the blade pitch control coupling 36, the rotor blade spindle 30 and the attached rotor blade 28 (FIG. 3E).

A pitch control rod 46 for each rotor blade assembly 20 is linked with the horn spindle coupling 38 to impart the desired pitch control thereto. It should be understood that the pitch control rod 46 may be located either internal or external the main rotor shaft of the rotor system 12 (FIG. 3D). Typically, the pitch control rods 46 are external to the main rotor shaft 12L for pitch control of the lower rotor system 18 through a lower rotor swashplate 47L and internal to the main rotor shaft 12U for pitch control of the upper rotor system 16 through an upper rotor swashplate 47U. It should be understood, that various pitch control rods and links at various locations may be utilized with the present invention.

Each bearing housing 32 includes a first housing lug set 50 and a second housing lug set 52 which correspond to an associated first hub lug set 54 and a second hub lug set 56 fixed to the respective rotor hub assembly 22, 24. It should be understood that any number of lugs may be utilized within each set. Preferably, the first housing lug set 50 and the second housing lug set 52 flank the blade pitch control coupling 36 while the first hub lug set 54 and a second hub lug set 56 flank the horn spindle coupling 38. A hinge pin 58 is engaged with the first hub lug set 54 and the first housing lug set 50 to define the fold hinge axis F for each housing 32.

An axially movable locking pin system 60 selectively engages the second housing lug set 52 and the second hub lug set 56 to lock each bearing housing 32 to the associated rotor hub assembly 22, 24 in the flight position (FIG. 3A). The axially movable locking pin system 60 is preferably driven by a locking pin drive 62 such as an electric motor or solenoid under control of a blade fold controller. For further understanding of other aspects of the a blade fold system and associated components thereof, attention is directed to U.S. patent application Ser. No. 11/524020, entitled ROTOR BLADE FOLDING SYSTEM (67,008-150) which is assigned to the assignee of the instant invention and which is hereby incorporated herein in its entirety.

By folding the bearing housing 32 with the blade retention/pitch bearing as a complete unit, pitch lock systems are minimized or eliminated as the pitch lock system need only react a blade-feathering moment which is about three orders of magnitude less than that of a conventional blade-fold system requirement. That is, since blade fold occurs inboard of the pitch bearing (semi-rigid or articulated), the 1G droop moment will not produce a torsion about the pitch bearing degree of freedom, and the pitch lock can be a significantly reduced structure. Folding the blade inboard of the pitch bearing on a conventional rotor would disadvantageously require the pitch link to be disconnected from the pitch horn. It should be understood that various pitch lock systems may be minimized or eliminated as described above as the blade retention/pitch bearings are within and fold with the bearing housing 32.

Figure 4A:
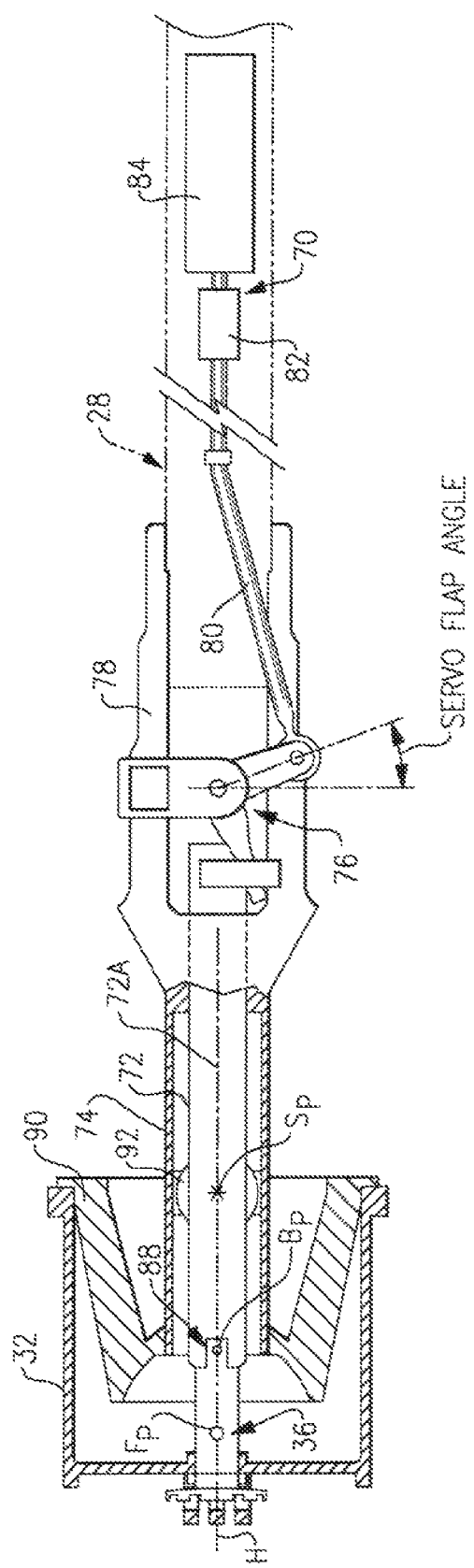
FIG. 4A is a side partial sectional view of a fully articulated rotor blade assembly with a servo-flap rotor control system.

Referring to FIG. 4A, a fully articulated rotor blade assembly 20 with a servo-flap rotor control system 70 is illustrated. It should be understood that various trailing and leading edge slat and flap mounting arrangements will benefit from the present invention.

Figure 4B:
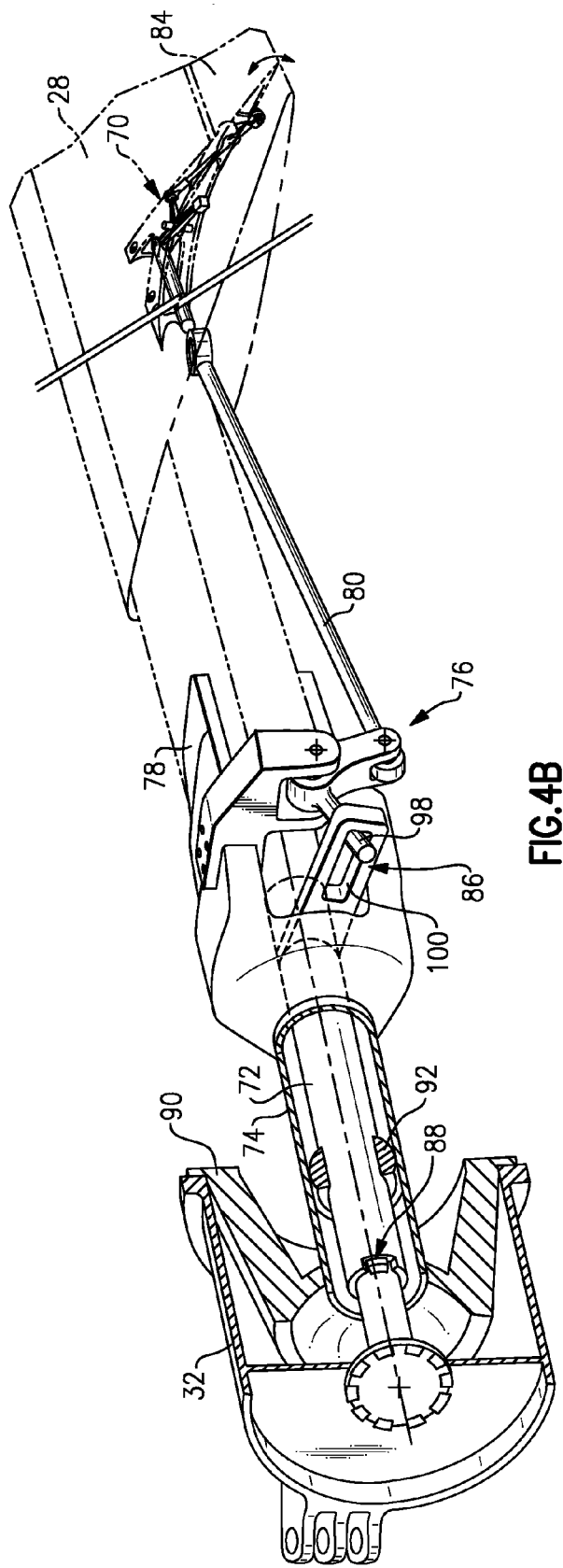
FIG. 4B is a perspective partial sectional view of a fully articulated rotor blade assembly with a servo-flap rotor control system of FIG. 4A.

The bearing housing 32 rotationally supports the blade pitch control coupling 36 which rotates about the hub spindle axis H. The blade pitch control coupling 36 rotates a servo-flap pitch control tube 72 about a servo-flap control tube axis 72A within a rotor blade retention spindle 74. Rotation of the servo-flap pitch control tube 72 articulates a servo-flap drive linkage 76 preferably mounted to a rotor blade cuff 78. The servo-flap drive linkage 76 includes a bell crank hinge point 77 preferably located along the servo-flap control tube axis 72A within a plane defined generally parallel to the rotor blade 28 within the rotor blade cuff 78. The servo-flap drive linkage 76 drives a push/pull link 80 to operate a servo-flap linkage 82 which converts the push/pull motion of the push/pull link 80 into a pitching motion of a servo-flap 84 (also illustrated in FIG. 4B) relative to the rotor blade 28.

The torsional motion of the servo-flap pitch control tube 72 is converted into linear motion by the servo-flap drive linkage 76. The servo-flap drive linkage 76 includes a slotted interface 86 (best seen in FIG. 4B) between the servo-flap drive linkage 76 and the servo-flap control tube 72 to accommodate relative chordwise reactive movement therebetween during lead/lag motion. That, is the torsional motion of the servo-flap pitch control tube 72 is captured by the servo-flap drive linkage 76 but fore/aft motion of the servo-flap pitch control tube 72 is absorbed by the slotted engagement. It should be understood that other linkages which capture other motions of the blade servo-flap pitch control tube 72 relative to the blade retention spindle 74 as the rotor blade flaps and lead/lags will also be usable with the present invention.

The flapping and lead/lag motions of the rotor blade 28 are decoupled from the blade pitch control coupling assembly 36 by a joint 88. The joint 88 is preferably a U-joint or the like which is located between the blade pitch control coupling assembly 36 and the servo-flap pitch control tube 72 to define a servo-flap pitch control tube pivot point Bp. That is, the joint 88 separates the hub spindle axis H from the servo-flap control tube axis 72A.

The bearing housing 32 supports an elastomeric spherical bearing 90 which supports the rotor blade retention spindle 74. The blade retention spindle 74, which is supported by the elastomeric spherical bearing 90, is defined along the rotor blade pitch axis P. The focal point Fp of the elastomeric spherical bearing 90 is located along the hub spindle axis H inboard of the servo-flap pitch control tube pivot point Bp. Furthermore, the focal point Fp is generally relatively close to the fold hinge F which reduces the hinge offset and the bending loads at the fold hinge.

Figure 5A:
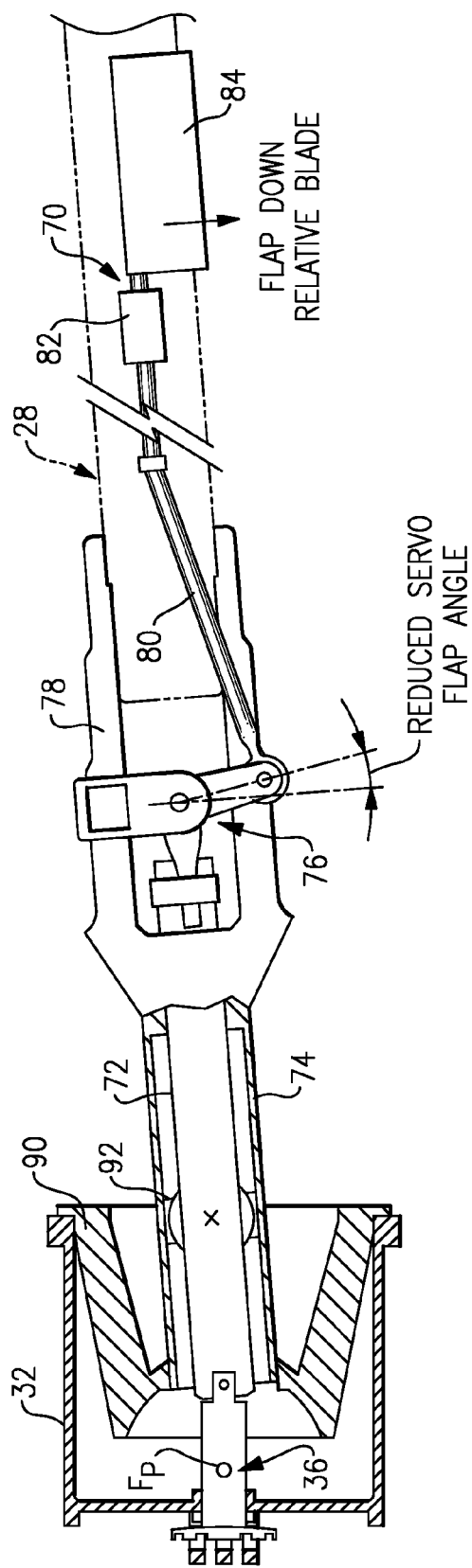
FIG. 5A is a side partial sectional view of a fully articulated rotor blade assembly with a servo-flap rotor control system in a flapped position.
Figure 5B:
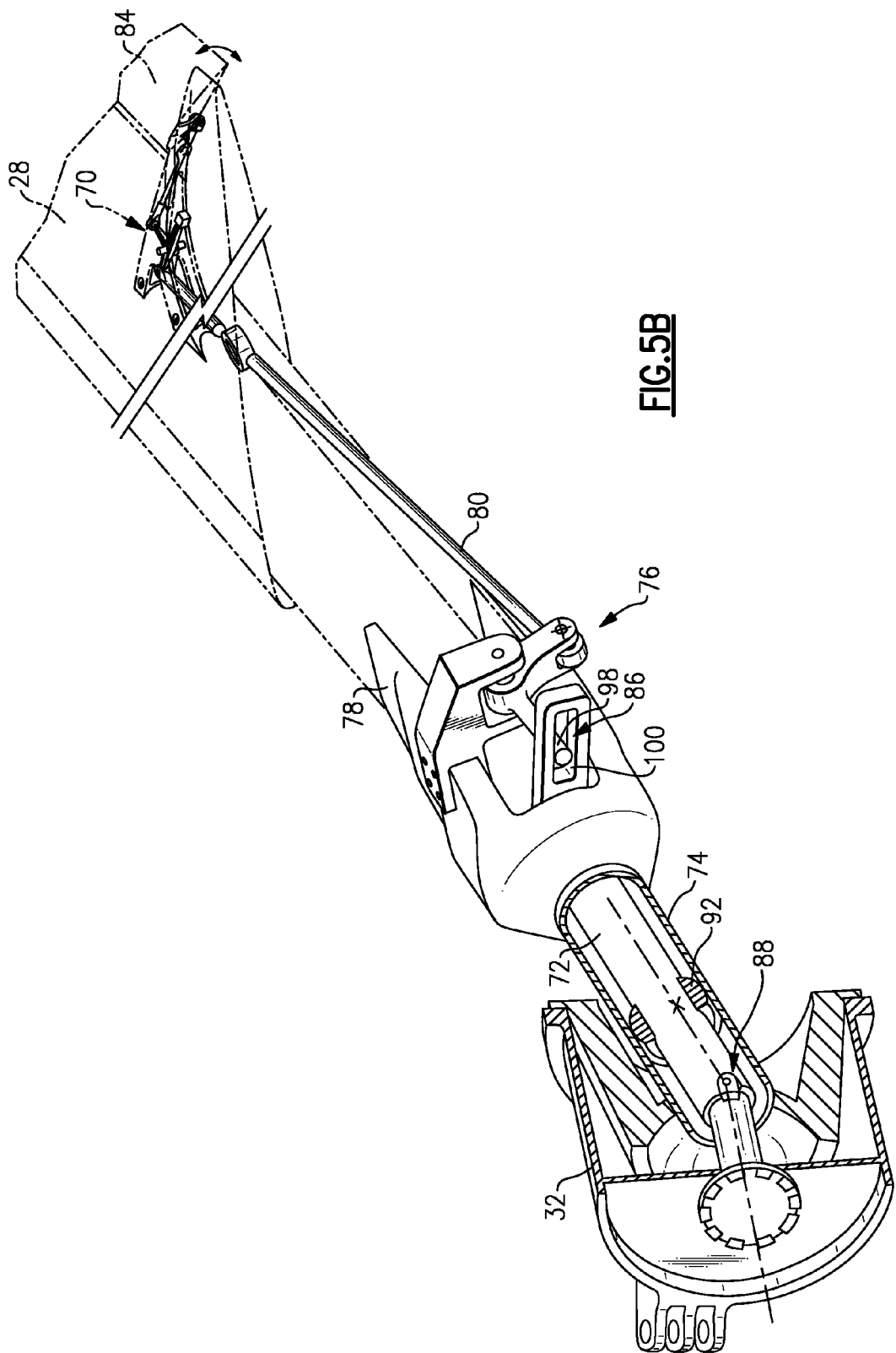
FIG. 5B is a perspective partial sectional view of a fully articulated rotor blade assembly with a servo-flap rotor control system of FIG. 5A in a flapped position.

The blade servo-flap pitch control tube 72 is pivotally mounted within the blade retention spindle 74 about a spherical pivot bearing 92 which defines a spherical pivot point Sp located outboard of the servo-flap pitch control tube pivot point Bp. By projecting the focal point Fp inboard of the joint 88 (separating the flap hinge), and pivoting the blade servo-flap pitch control tube 72 about the single spherical pivot bearing 92, blade flap will produce relative linear (radial) and vertical movements between the blade servo-flap pitch control tube 72, and the blade retention spindle 74 (FIGS. 5A and 5B). This relative motion is converted through the linkage into servo-flap pitch motion.

The spherical pivot bearing 92 is preferably axially movable and lockable at a multiple of positions along the blade pitch axis P within the blade retention spindle 74. By axially positioning the spherical pivot bearing 92, the spherical pivot point Sp moves therewith such that blade flap-pitch coupling is effectively adjusted. It should be understood, that the spherical pivot bearing 92 may be manually adjusted while the aircraft is on the ground during maintenance and testing. Generally, the further outboard the pivot bearing is placed, the smaller the coupling.

Alternatively, the spherical pivot bearing 92 may alternatively be adjustable in-flight such that aircraft flight characteristics may be adjusted for particular flight conditions in response to a flight control system.

In operation, since the elastomeric spherical bearing focal point Fp is located inboard of the servo-flap pitch control tube pivot point Bp (FIG. 6A), and the blade servo-flap pitch control tube 72 is free to tilt relative to the blade retention spindle 74 as the blade flaps (FIG. 6B), a stabilizing pitch-flap coupling can be generated. That is, if a pitch-up input is applied causing the blade to flap up (FIG. 6B), the flap-up motion of the blade will generate a servo-flap pitch-up input due to the relative vertical and radial movement between points A and B (FIG. 6C) such that a desired pitch/flap coupling (Delta-3) is achieved. That is, during blade flapping, relative vertical and radial motions occur between the blade servo-flap pitch control tube 72 and the blade retention spindle 74. These relative vertical and radial motions of the tilting blade servo-flap pitch control tube 72 drive the servo-flap drive linkage 76 to pitch the servo-flap 84 relative the rotor blade 28. Preferably, flapping up produces a tension in the push/pull link 80 to pitch the servo-flap 84 up which thereby provides a pitch-down movement in the rotor blade 28. The primary relative motion (vertical) provides favorable delta-3 for flap up and flap down, regardless of coning. Only the radial component requires coning.

Referring to FIG. 7A, another servo-flap drive linkage 76A includes a bell crank hinge point 77A (FIG. 7B) located above the servo-flap control tube axis 72A. The servo-flap drive linkage 76A includes a bell crank hinge point 77A located above the servo-flap control tube axis 72A (distance D) defined within a plane generally parallel to the rotor blade 28 within the rotor blade cuff 78.

The servo-flap drive linkage 76A also includes a slide-restrained connection provided by stops 96 on a pin 98 which interfaces with the slotted interface 86. That is, the pin 98 is restrained within a slot 100 of the slotted interface 86 by the stops 96. It should be understood that the pin 98 may be threaded to receive threaded stops 96 to provide adjustment therebetween. The offset bell crank hinge point 77A and the stops 96 allow spanwise (radial) foreshortening of the servo-flap pitch control tube 72 (which occur as the blade flaps) to impart push/pull inputs to the servo flap 84 through the push/pull link 80. As the servo-flap pitch control tube 72 pitches, the slot 100 permits the spindle to lead/lag without imparting the push/pull response.

A primary relative movement between the servo-flap pitch control tube 72 and the blade spindle is vertical (due to blade flap), and the servo-flap drive linkage 76A converts this relative vertical movement into pushing and pulling of the push/pull link 80 to actuate the servo-flap 84. A secondary relative movement is radial, which may be captured or neglected by the servo-flap drive linkage 76A. To neglect the radial movement, the servo-flap drive linkage 76A must be free to slide radially (best viewed in FIG. 5B). Conversely, to capture the radial movement, the servo-flap drive linkage 76A is connected radially to the servo-flap pitch control tube 72 by the stops 96 and the bell crank hinge point 77A is located above the servo-flap pitch control tube axis 72A. Otherwise, loads due to radial foreshortening will be transmitted directly to the hinge without providing any push/pull response.

By locating the bell-crank hinge point 77A off of the servo-flap control tube axis 72A (distance D), positive flap-up flapping motion above the coning flight position of the main rotor blade will generate a servo-flap pitch-down input due to the distance D. Flapping above or below the coned position provides favorable delta-3 in both directions.

For example only, if the servo-flap pitch control tube 72 has a length L=30 in, and the servo-flap pitch control tube 72 flaps 10 degrees above horizontal, the effective foreshortening is L−L cos 10=0.4558 inches. If the servo-flap pitch control tube 72 flaps down 10 degrees (from horizontal), the effective foreshortening is L−L cos(−10)=0.4558. Since the servo-flap pitch control tube 72 gets shorter during both up and down flapping such that the resulting delta 3 is favorable only during upward flapping.

If the servo-flap pitch control tube 72 is biased up 10 degrees (due to a coned flight position and flaps up 10 and down 10 degrees about this point, the effective length will change from (30−0.4558=29.544) to (30−(30−30 cos 20)=28.191 during flap up and (30−(30−30 cos 0)=30 during flap down. With this example, flapping about the coned flight position will enable the projected effective length to shorten during flap up and lengthen during flap down—relative the coned flight position—which provides a favorable delta 3 in both directions.

|  | 10 Degree Coning Initial Position | No Coning Initial Position |
|---|---|---|
| Initial Effective Radial Length of servo-flap pitch control tube | 29.544 | 30 |
| 10 Degree Flap Up From Initial Position | 28.191 | 29.544 |
| 10 Degree Flap Down From Initial Position | 30 | 29.544 |

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotor blade assembly comprising:
    a rotor blade bearing housing;
    a blade pitch control coupling mounted within said rotor blade bearing housing for rotation about a blade hub axis;
    an elastomeric bearing mounted to said rotor blade bearing housing;
    a blade spindle mounted to said elastomeric bearing to define a blade spindle flapping focal point;
    a spherical bearing mounted within said blade spindle; and
    a servo-flap pitch control tube mounted within said spherical bearing for rotation about a servo-flap pitch control tube axis, said servo-flap pitch control tube mounted to said blade pitch control coupling at a joint which defines a servo-flap pitch control tube pivot point, said servo-flap pitch control tube pivot point offset from said blade spindle flapping focal point, said servo-flap pitch control tube drives a servo-flap assembly relative a rotor blade.

2. The assembly as recited in claim 1, wherein said servo-flap pitch control tube pivot point is outboard of said blade spindle flapping focal point.

3. The assembly as recited in claim 1, wherein said servo-flap pitch control tube rotates about said servo-flap pitch control tube axis to drive a servo-flap drive linkage mounted to a rotor blade cuff.

4. The assembly as recited in claim 3, wherein said servo-flap drive linkage drives a push-pull link.

5. The assembly as recited in claim 4, wherein said push-pull link actuates a servo-flap.

6. The assembly as recited in claim 4, wherein said push-pull link actuates a servo-flap linkage which pitches said servo-flap relative said rotor blade.

7. The assembly as recited in claim 1, wherein said rotor blade bearing housing is foldable about a fold axis.

8. The assembly as recited in claim 1, further comprising a rotor blade cuff mounted to said blade spindle.

9. The assembly as recited in claim 8, further comprising a main rotor blade mounted to said rotor blade cuff.

10. The assembly as recited in claim 1, wherein said elastomeric bearing is an elastomeric spherical bearing.

11. A servo-flap rotor blade assembly comprising:
    a rotor blade bearing housing;
    an elastomeric bearing mounted to said rotor blade bearing housing;
    a blade spindle mounted to said elastomeric bearing to define a blade spindle flapping focal point;
    a blade cuff mounted to said blade spindle;
    a rotor blade mountable to said blade cuff;
    a spherical bearing mounted within said blade spindle;
    a servo-flap pitch control tube mounted within said spherical bearing for rotation about a servo-flap pitch control tube axis, said servo-flap pitch control tube mounted at a joint which defines a servo-flap pitch control tube pivot point, said servo-flap pitch control tube pivot point offset from said blade spindle flapping focal point; and
    a servo-flap pitchable relative to said rotor blade in response to rotation of said servo-flap pitch control tube.

12. The assembly as recited in claim 11, wherein said servo-flap pitch control tube rotates about said servo-flap pitch control tube axis to drive a servo-flap drive linkage mounted to said rotor blade cuff.

13. The assembly as recited in claim 12, wherein said servo-flap drive linkage includes a slotted interface between said servo-flap pitch control tube and said servo-flap drive linkage.

14. The assembly as recited in claim 13, wherein said servo-flap drive linkage drives a push-pull link.

15. A method of pitch/flap coupling for a rotor blade assembly of a rotary-wing aircraft comprising the steps of:
    (A) flapping a rotor blade spindle about a blade spindle flapping focal point;
    (B) flapping a servo-flap pitch control tube about a servo-flap pitch control tube pivot point offset from the blade spindle flapping focal point; and
    (C) tilting the servo-flap pitch control tube relative the blade spindle in response to said step (B) to pitch a servo-flap relative a rotor blade.

16. A method as recited in claim 15, wherein said step (C) further comprises:
    (a) tilting the servo-flap pitch control tube in response to flap-up motion of the rotor blade spindle to pitch down the servo-flap to obtain a pitch/flap (Delta-3) coupling.

17. A method as recited in claim 15, further comprising the step of:

(D) folding a rotor blade bearing assembly which supports the rotor blade spindle inboard of an elastomeric bearing mounted within the rotor blade bearing assembly relative a rotor hub about a fold axis.

18. A rotor blade assembly comprising:
a rotor blade;
a servo-flap movable relative to said rotor blade;
a blade spindle mounted to said rotor blade, said blade spindle defines a blade spindle flapping focal point; and
a servo-flap pitch control tube mounted at least partially through said blade spindle, said servo-flap pitch control tube defines a servo-flap pitch control tube pivot point offset from said blade spindle flapping focal point, said servo-flap pitch control tube free to tilt about said servo-flap pitch control tube pivot point relative to said blade spindle as said rotor blade flaps about said blade spindle flapping focal point such that said servo-flap pitch control tube pitches said servo-flap relative to said rotor blade to generate a stabilizing pitch-flap coupling.

19. The assembly as recited in claim 18, further comprising a spherical bearing mounted within said blade spindle to define said servo-flap pitch control tube pivot point.

20. The assembly as recited in claim 19, wherein said spherical pivot bearing is axially adjustable.

21. The assembly as recited in claim 18, further comprising a rotor blade cuff mounted to said blade spindle to support said rotor blade.

22. The assembly as recited in claim 21, wherein said servo-flap pitch control tube is rotatable about a servo-flap pitch control tube axis to drive a servo-flap drive linkage mounted to said rotor blade cuff.

23. The assembly as recited in claim 21, wherein tilt of said servo-flap pitch control tube tilts about said servo-flap pitch control tube pivot point relative to said blade spindle to drive a servo-flap drive linkage mounted to said rotor blade cuff.

24. The assembly as recited in claim 23, wherein said servo-flap drive linkage drives a push-pull link to pitch said servo-flap such that flapping up produces a tension in said push/pull link to pitch said servo-flap up to provide a pitch-down movement in said rotor blade and flapping down produces a compression in said push/pull link to pitch said servo-flap down to provide a pitch-up movement in said rotor blade.

* * * * *